April 5, 1960  A. J. O'DONNELL  2,931,621
SUPPORTING PLATES FOR TURBINE BLADES
Filed Dec. 15, 1952  2 Sheets-Sheet 1
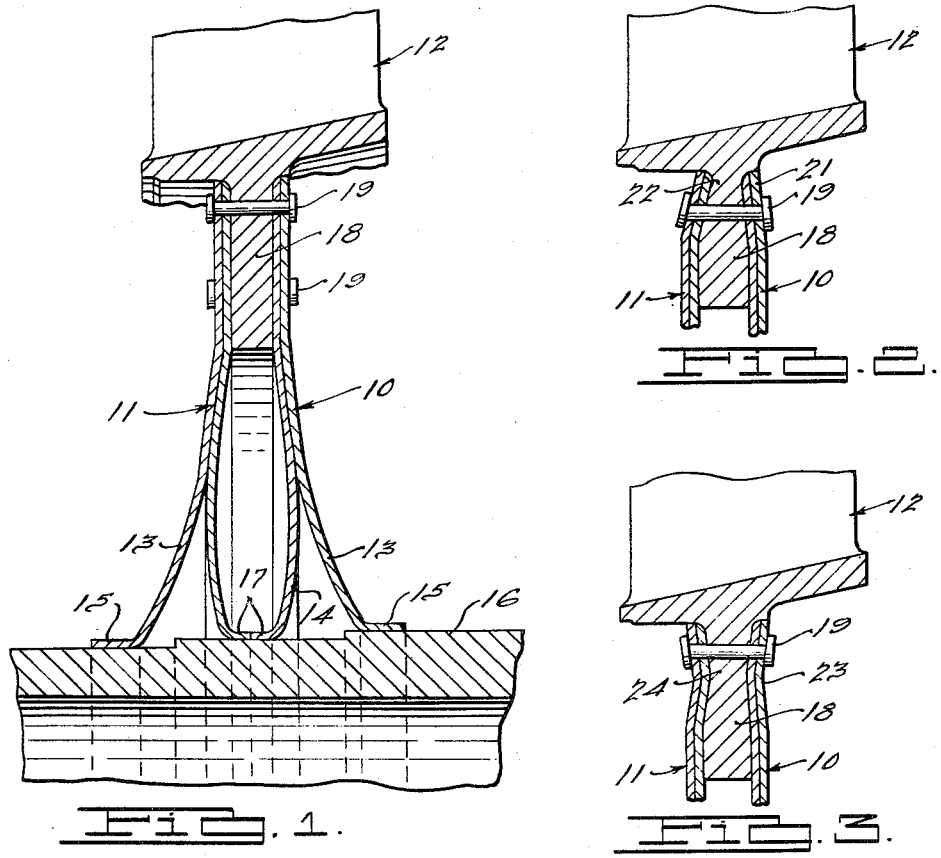
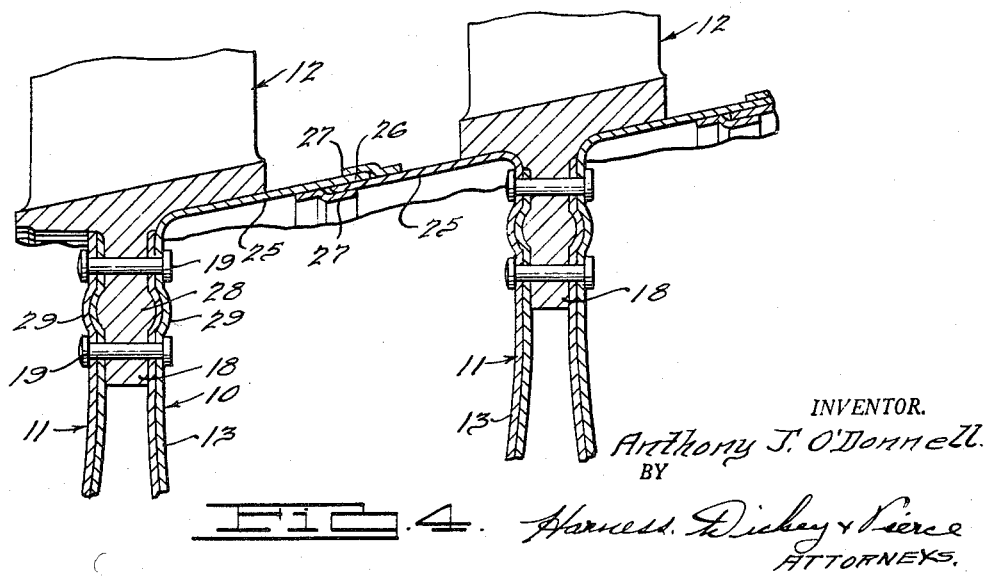
INVENTOR.
Anthony J. O'Donnell
BY
Harness, Dickey & Pierce
ATTORNEYS.

April 5, 1960 A. J. O'DONNELL 2,931,621
SUPPORTING PLATES FOR TURBINE BLADES
Filed Dec. 15, 1952 2 Sheets-Sheet 2

INVENTOR.
Anthony J. O'Donnell
BY
Harness, Dickey & Pierce
ATTORNEYS.

United States Patent Office 2,931,621
Patented Apr. 5, 1960

2,931,621

SUPPORTING PLATES FOR TURBINE BLADES

Anthony J. O'Donnell, Detroit, Mich.

Application December 15, 1952, Serial No. 326,085

11 Claims. (Cl. 253—39)

This invention relates to tapered circular supporting disks for turbine blades, and particularly to supporting disks which are constructed from formed members mated in pairs to provide a desired contour and diameter.

Difficulty has been experienced when providing the tapered washerlike disks for supporting turbine blades. Tedious and expensive machining was required to produce the desired contour on opposite sides of the disks, resulting in a waste of a large portion of the expensive metal and the scrapping of many of the disks during and after the machining operation.

The present invention produces a disk, similar to the machined disks, made from sheet material, one member of which is formed to the contour of one side of the disk while the other member is formed to the contour of the other side thereof. When the members are secured together in the outer contacting area and to a central hub element by brazing or other means, the assembled members provide exactly the same contour as the disk which was produced by the expensive machining operation above noted.

Accordingly, the main objects of the invention are: to provide a washerlike disk for supporting turbine blades which is made of two stamping members brazed together in the outer contacting area and to a supporting hub element; to provide supporting disks for turbine blades which are made from two stamping members one of which has the contour of the outer surface of the disk, the other of which has the contour of the inner surface thereof, both of which are secured together by a brazing or other operation at the outer contacting area and to a central hub element; to form the outer edges of supporting disks for turbine blades and the shank of the blades with interlocking portions which aid in preventing the blades from separating from the disks due to centrifugal force; to provide flanges on the outer peripheral edges of the disks which are disposed in substantially aligned relation for spacing adjacent pairs of the disks when assembled upon a shaft; and, in general, to provide supporting disks for turbine blades which are simple in construction and economical of manufacture.

Other objects and features of novelty of the invention will be specifically pointed out or will become apparent when referring, for a better understanding of the invention, to the following description, taken in conjunction with the accompanying drawings, wherein:

Figure 1 is a broken, sectional view of the two sets of fabricated disks for supporting turbine blades on a shaft;

Fig. 2 is a broken view of structure, similar to that illustrated in Fig. 1, showing another form thereof:

Fig. 3 is a view of structure, similar to that illustrated in Fig. 2, showing a still further form of the invention:

Fig. 4 is a broken view of structure, similar to that illustrated in Fig. 1, showing another form which the invention may assume;

Figure 5:
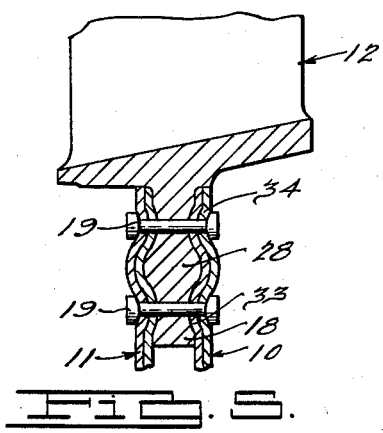
Figs. 5, 6 and 7 are views of structure, similar to those illustrated in the foregoing figures, illustrating other forms of the invention.

Referring to Fig. 1, a pair of fabricated supporting disks 10 and 11 is illustrated for supporting a series of turbine blades 12 at the outer periphery thereof. Each disk 10 and 11 is made of a pair of formed members 13 and 14, the outer member 13 having the predetermined contour desired for the outer surface of the disk, while the member 14 has the contour desired for the inner surface of the disk. The outer member 13 is provided with an outwardly directed flange 15 at the inner periphery which engages the rotor shaft 16 at the respective diameters thereof. As herein illustrated the diameter of the shaft is stepped and this occurs from each end so that the disks may be press-fitted only at the area of final engagement, as is the conventional practice in rotors of turbines and turbine jet engines. The inner members 14 in a similar manner are provided with flanges 17 at the inner periphery thereof which engage the surface of the shaft between the flanges 15 of the outer disks 13. The flanges 15 and 17 are brazed or otherwise secured to the shaft and the outer mated areas of the members 13 and 14 are secured together as by brazing. The shank 18 of the blades 12 is secured between the disks 10 and 11 by suitable means, herein illustrated as by rivets 19, in the conventional manner.

In Fig. 2, the outer end portion of the disk is angled inwardly at 21 to engage the reduced neck portion 22 of the shank 18 for locking the blade shanks between the end portion of a pair of disks when the blades are drawn together by the rivets. In Fig. 3, the end portions of the disks 10 and 11 are deflected inwardly and outwardly at 23 for clamping the shank 18 which has a reduced or necked portion 24 for receiving the angularly shaped end portion of the disks for locking the shank therebetween. In Fig. 4, the outer members 13 of the disks 10 and 11 are flanged outwardly at 25 so as to be disposed in overlapping relationship at 26 and anchored to each other by the offset strips 27 forming pockets into which the ends of the flanges 25 nest, to thereby space the disks 10 and 11 relative to each other when assembled on the shaft. In this arrangement, the shanks 18 of the blades have been expanded at 28 and are engaged by the expanded groove 29 of the disks 10 and 11, to thereby more securely anchor the shank between the disks when secured together by the rivets 19.

Figure 8:
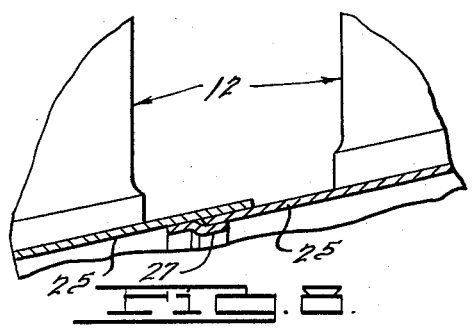
Fig. 8 is a view of structure, similar to that illustrated in Fig. 4, showing another form thereof.
Figure 9:
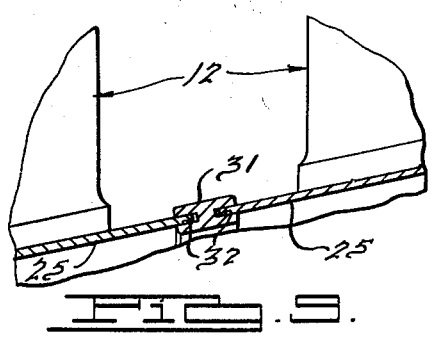
Fig. 9 is a view of structure, similar to that illustrated in Fig. 8, showing still another form of the invention.

In Fig. 8, only a single strip 27 is illustrated as being applied to one of the flanges 25 of the members 13 which secure the two ends of the flanges 25 together in face-to-face relationship and space the disks 10 and 11 from each oher. In Fig. 9, the flanges 25 are illustrated as being in aligned relation and spaced by a bar 31, having slots 32 therein in which the ends of the flanges extend. The bar retains the flanges in aligned relationship and spaces the disks 10 and 11 a predetermined distance from each other.

The shank 18 of the blade illustrated in Fig. 5 is similar to the shank 18 of that illustrated in Fig. 4, with the exception that recesses 33 are provided on each side of the expanding portion 28 to form sinuous walls on the shank which mate with the sinuous grooves 34 in the edge portions of the disks 10 and 11 to more securely anchor the shanks to the disks.

Figure 6:
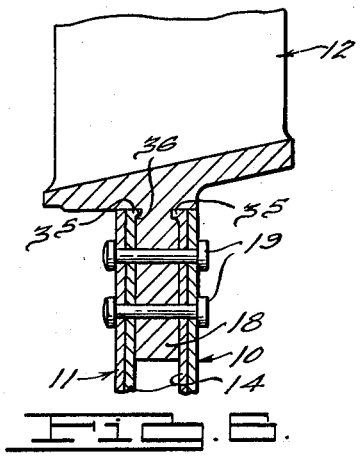
Figure 7:
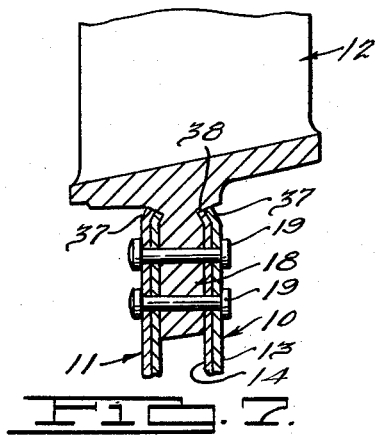

In Fig. 6, a further form of anchor is illustrated between the disks 10 and 11 and the blade shank 18, that wherein the inner members 14 have the outer peripheral ends extended inwardly at 35 to engage slots 36 in the shanks 18 to thereby more securely anchor the shank to the disks. In Fig. 7, a similar anchor is illustrated, that wherein the edges of both members 13 and 14 of the disks 10 and 11 are bent inwardly at 37 to extend into angular recesses 38 in the neck of the shanks 18 for more securely anchoring the shanks to the peripheral edges of the disks 10 and 11 when secured thereto by rivets 19.

Figure 10:
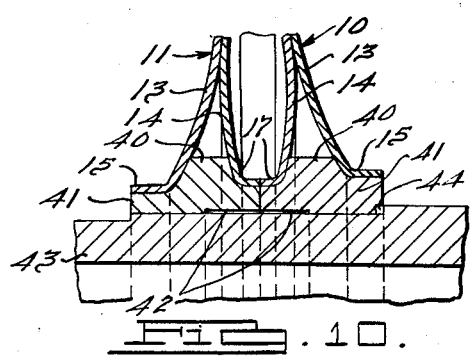
Fig. 10 is a view of structure similar to that illustrated in Fig. 1 showing another form of the invention.

In Fig. 10, the disks 10 and 11 are illustrated as having the pairs of members 13 and 14 mounted on opposite sides of an annular land 40 of a hub 41. The flanges 15 and 17 mate with the side contours of the land and are directly brazed or otherwise secured thereto, preferably at the time the outer mated portions of the members are brazed or otherwise secured together. A portion of the internal surface of the hubs may be slightly enlarged, as at 42, to provide clearance when the hub is pressed upon the shaft 43. The hub is locked upon the shaft by the interengaged teeth 44 provided on the shaft and the adjacent hub. Otherwise, the disks are the same as hereinabove described.

In any of the arrangements, the disks for supporting the blades are made from a pair of stamped or otherwise formed members which, when assembled, provide the desired inside and outside surface contours. The members at their outer mating areas and at the point of engagement of the inner area with the shaft or hub are brazed or otherwise secured, and the shanks of the blades are riveted therebetween. The shanks of the blades are preferably so formed as to have interlocking relation with the peripheral portion of the disks when secured thereto by riveting, brazing or any other means. The interlocking formation between the disks and the blades provides additional assurance that the blades will withstand a centrifugal force applied thereto during operation. The engagement of the extending flanges 25 of the adjacent disks locks the assembly into a unit construction, with each set of blades spaced a predetermined distance from the adjacent set. It is to be understood that the lapped or abutting edges of the flanges 25 may be bolted, brazed or otherwise secured together after assembly to provide a more rigid construction.

What is claimed is:

1. A disc assembly for supporting a turbine blade on a shaft comprising a turbine blade, a pair of washer-shaped discs adapted to be mounted on the shaft and support a portion of said turbine blade therebetween, each of said washer-shaped discs comprising an outer washer-shaped member of predetermined contour and an inner washer-shaped member having the same contour at the radially outward portion thereof and a different contour at the radially inward portion thereof for spacing the members apart at said radially inward portion, the portions of said members having the same contour being secured together in mating relationship, the mated peripheral portions of each of said washer-shaped disks cooperating with one another to define an axially extending pocket therebetween for receiving and securing said portion of the turbine blade.

2. A disc assembly for supporting a turbine blade on a shaft comprising a turbine blade, a pair of washer-shaped discs adapted to be mounted on the shaft and support a portion of said turbine blade therebetween, each of said washer-shaped discs comprising an outer washer-shaped member of predetermined contour, an inner washer-shaped member having the same contour at the radially outward portion thereof and a different contour at the radially inward portion thereof for spacing the members apart when the radially outward portions are secured together, and brazing material securing said radially outward portions together in mating relationship, the mated peripheral portions of each of said washer-shaped disks cooperating with one another to define an axially extending pocket therebetween for receiving and securing said portion of the turbine blade.

3. A disc assembly for supporting a turbine blade on a shaft comprising a pair of washer-shaped discs adapted to be mounted on the shaft and support a turbine blade therebetween, each of said washer-shaped discs comprising inner and outer washer-shaped members having axially extending flanges on the inner periphery thereof directed outwardly of each other, the adjacent radially inward portions of the members being spaced apart, the radially outward portions of the members being formed of a predetermined contour and secured in mated relation to each other, the mated radially outward portions of said discs cooperating with one another to define an axially extending pocket therebetween adapted to receive and secure a portion of the turbine blade therebetween.

4. The subject matter as claimed in claim 3 wherein said flanges define central apertures of different diameters.

5. The subject matter as claimed in claim 4 wherein the mating radially outward portions of said members are formed to have an interlocking relationship with the shank of a turbine blade when it is inserted in the axially extending pocket defined by the radially outward mated portions of said members.

6. The subject matter as claimed in claim 4 including a sleeve hub having an annular land provided with side contours mated with and secured in fixed relation to said axially spaced flanges defining said central openings.

7. The subject matter as claimed in claim 6 wherein the inner diameter of a portion of the width of said hub is slightly enlarged to provide clearance between the hub in a shaft adapted to extend therethrough.

8. A disc assembly for supporting a turbine blade on a shaft comprising a pair of washer-shaped discs adapted to be mounted on the shaft and support a turbine blade therebetween, each of said washer-shaped discs comprising a pair of washer-shaped members having a central aperture defined by axially extending flanges directed outwardly of each other, the adjacent radially inward portions of the members being spaced apart, the radially outward peripheral portions of the members being formed of a predetermined contour and disposed in mated relation to each other, the mated radially outward peripheral portions of said discs defining an axially extending pocket therebetween adapted to receive and secure a portion of the turbine blade therebetween, a flange on the outer peripheral edge of one member being disposed substantially parallel to the flange defining the central aperture thereof, and securing means on said peripheral flange adapted to secure the peripheral flange to a corresponding flange of an adjacent disc assembly so that a plurality of disc assemblies can be interlocked in axially spaced relation with one another.

9. A disc assembly for supporting a turbine blade on a shaft comprising a pair of washer-shaped discs adapted to be mounted on the shaft and support a turbine blade therebetween, each of said washer-shaped discs comprising a pair of formed washer-shaped members provided with a central aperture defined by an axially extending flange on each member directed outwardly away from each other, the adjacent radially inward portions of the members being spaced apart, the radially outward peripheral portions of the members being formed of a predetermined contour and disposed in mated relation to each other, the mated radially outward portions of said discs cooperating with one another to define an axially extending pocket therebetween adapted to receive and secure a portion of a turbine blade therebetween and a flange on the radially outward peripheral edge of at least one of the members being disposed substantially parallel to the flange defined by the central aperture thereof, and adapted to be secured to a similar flange on an adjacent disc assembly to enable the disc assemblies to be interlocked together in axially spaced relationship.

10. A plurality of disc assemblies for supporting turbine blades on a shaft, each disc assembly comprising a pair of washer-shaped discs adapted to be mounted on the shaft and support a turbine blade therebetween, each of said washer-shaped discs comprising an outer washer-shaped member and an inner washer-shaped member, said inner and outer members having central openings therein, said openings being defined by axial flanges in spaced opposing relation, said inner and outer members having outer peripheral portions of like contours secured together in mating relationship, the outer peripheral mating portions of each pair of discs cooperating to define an axially extending pocket therebetween adapted to receive and secure a portion of a turbine blade therebetween, one of said members of substantially all of said discs having a flange extending axially outwardly from the outer periphery thereof, and a bar having aligned slots therein receiving the edges of the outer peripheral flanges of adjacent disc assemblies and spacing the outer peripheral portions of the disc assemblies a predetermined distance from each other.

11. A disc assembly for supporting a turbine blade on a shaft comprising a pair of washer-shaped discs adapted to be mounted on the shaft and support a turbine blade therebetween, each of said washer-shaped discs comprising an outer washer-shaped member of predetermined contour, an inner washer-shaped member having the same contour at the radially outward portion thereof and a different contour at the radially inward portion thereof for spacing the members apart at said radially inward portion, the portions of said members having the same contour being secured together in mating relationship, and means on the discs for holding the mated peripheral portions of each of said discs in axially spaced relation to define an axially extending pocket therebetween adapted to receive and secure a portion of a turbine blade therebetween.

References Cited in the file of this patent

UNITED STATES PATENTS

| Number | Name | Date |
|---|---|---|
| 770,207 | Wilkinson | Sept. 13, 1904 |
| 841,503 | Gelpke et al. | Jan. 15, 1907 |
| 910,311 | Pratt | Jan. 19, 1909 |
| 1,069,854 | Chisholm et al. | Aug. 12, 1913 |
| 1,074,691 | Bruman | Oct. 7, 1913 |
| 1,362,853 | Darling | Dec. 21, 1920 |
| 1,944,779 | Bowen | Jan. 23, 1934 |
| 2,008,300 | Feldbush | July 16, 1935 |
| 2,354,304 | Celio | July 25, 1944 |
| 2,405,190 | Darling | Aug. 6, 1946 |
| 2,492,833 | Baumann | Dec. 27, 1949 |
| 2,497,151 | Clark et al. | Feb. 14, 1950 |
| 2,620,675 | Meddows et al. | Dec. 9, 1952 |
| 2,623,357 | Birmann | Dec. 30, 1952 |
| 2,649,243 | Stalker | Aug. 18, 1953 |
| 2,772,851 | Stalker | Dec. 4, 1956 |
| 2,801,071 | Thorp | July 30, 1957 |

FOREIGN PATENTS

| Number | Country | Date |
|---|---|---|
| 42,539 | Austria | of 1910 |
| 131,066 | Australia | Jan. 20, 1949 |
| 138,808 | Austria | Apr. 15, 1934 |
| 662,527 | Great Britain | Dec. 5, 1951 |